Aug. 14, 1951  E. L. BUSH  2,564,051
BUOYANT HATCH COVER
Filed Nov. 20, 1945  2 Sheets-Sheet 1

INVENTOR.
EAN LEE BUSH
BY George B. White
his ATTORNEY

Aug. 14, 1951  E. L. BUSH  2,564,051
BUOYANT HATCH COVER
Filed Nov. 20, 1945  2 Sheets-Sheet 2
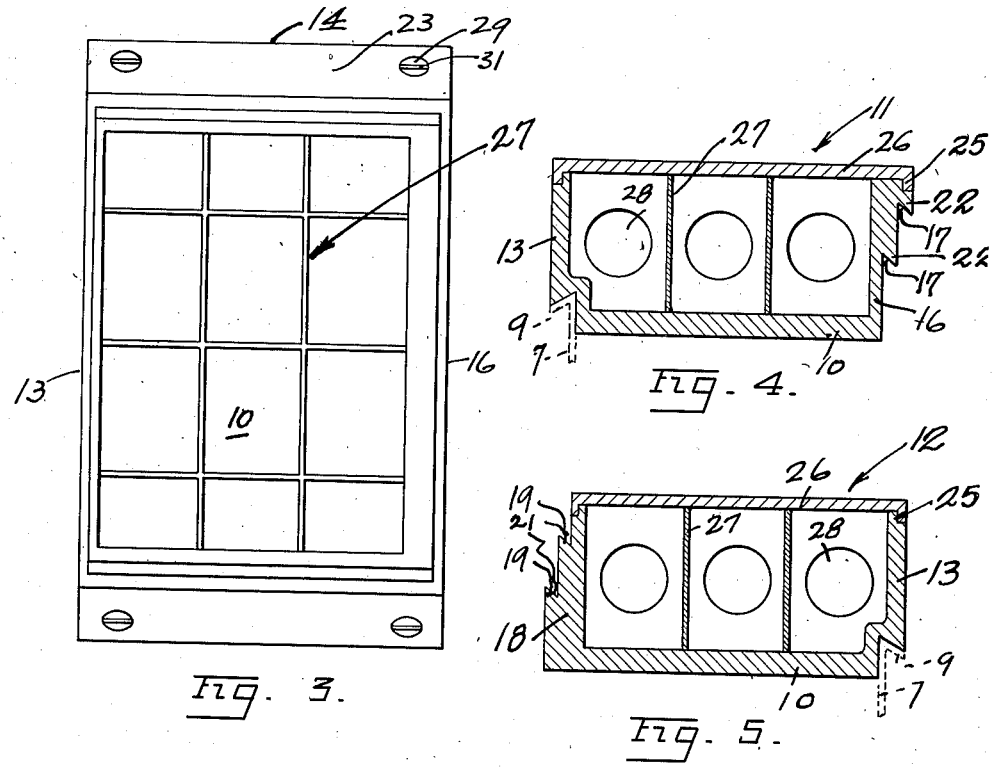
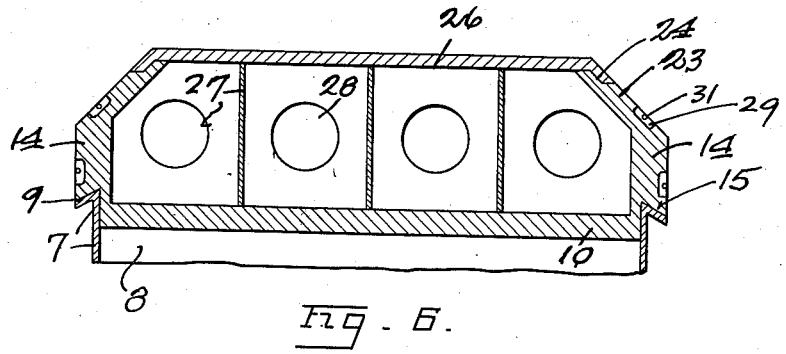
INVENTOR.
EAN LEE BUSH
BY George B White
his ATTORNEY Patented Aug. 14, 1951

2,564,051

UNITED STATES PATENT OFFICE 2,564,051

BUOYANT HATCH COVER

Ean Lee Bush, San Francisco, Calif.

Application November 20, 1945, Serial No. 629,750

2 Claims. (Cl. 114—201)

This invention relates to a hatch cover.

In the past, various types of structures and covers were used to cover the hatches on a ship or the like. There were even some attempts made to have such hatch covers made up in sections. However, the various attempts involved heavy structures in which the sealing of the cargo hatch remained a problem, and in all of which cases the bulky covers were in the way and took up useful space during loading or unloading, without the covers themselves being of any utility during those periods.

A feature of my invention is to provide a hatch cover which is buoyant and which is so constructed that when covering the hatch it forms a perfect seal on the hatch and when removed from the hatch it can be used in the water as a raft or loading barge or in any other suitable manner.

Another feature of my invention is to provide a hatch cover made of buoyant sections which interlock with each other and with the hatch rim so as to achieve a complete and perfect seal in covering position, but which can also be interconnected when dropped in the water so as to form a large life raft or barge or the like; means being provided to securely hold the latch sections together when used as a unit, and to mount on said sections various accessories needed to make them safer as life rafts or the like.

Another object of this invention is to provide a hatch cover which is highly useful and simple in construction. Convenience of arrangement, lightness and comparative inexpense of manufacture are further objects which have been borne in mind in the production and development of the invention.

It will be understood that various changes in the details of construction may be made without department from the spirit or scope of the invention as defined by the appended claims.

With the foregoing and other objects in view, which will be made manifest in the following detailed description, reference is had to the accompanying drawings for the illustrative embodiment of the invention, wherein:

Fig. 3 is a top plan view of one of the head sections with the top wall removed to show the cellular structure inside of the hatch;

Fig. 4 is a cross-sectional view of one of the hatch sections, the section being taken through said hatch section only and generally on the lines 4—4 of Fig. 1;

Fig. 5 is a cross-sectional view of the other complemental hatch section, the section being taken through said complemental hatch section only and generally on lines 5—5 of Fig. 1 and Fig. 6 is a sectional view, the section being taken longitudinally of one of the hatch covers on the line 6—6 of Fig. 1.

Figure 1:
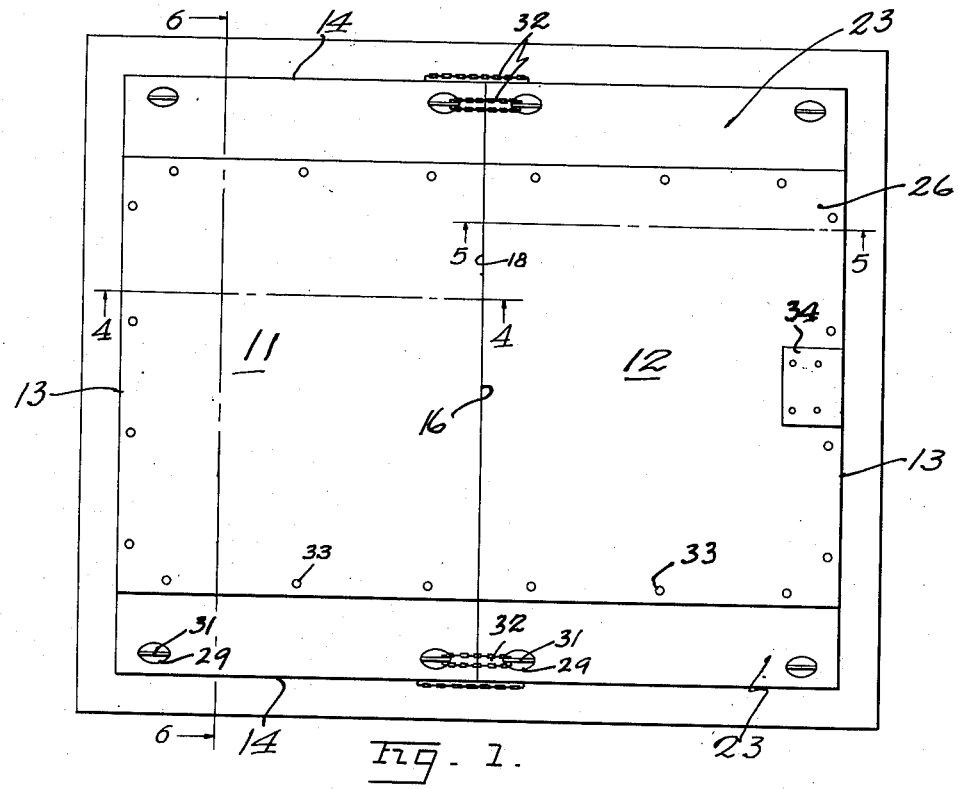
Fig. 1 is a plan view showing my hatch cover in a box.

My invention herein is shown in combination with the flanges 7 of a hatch opening 8. Such hatches are usually used for loading or unloading cargo in ships or the like. The flanges 7 form a rim around the entire opening 8 of the hatch. The upper edges of the flanges 7 are bent downwardly toward the deck at an acute angle with the vertical flanges 7 so as to form rims 9 which slant outwardly and toward the deck.

My hatch cover may be made up of two or more sections, but in the herein illustrations it is shown as made up of two complemental hatch sections 11 and 12. Each hatch cover section 11 or 12 has an outer edge 13 and ends 14 which are recessed to form ledges 15 near the bottom 10 of said hatch cover so as to fit over the rims 9 of the hatch flanges 7 on three sides and to be supported thereon as well as to seal those portions of the hatch rim.

The fourth side 16 of one of the hatch sections, in this instance, the hatch section 11, is provided with a plurality of downwardly directed angular serrations or recesses 17 which extend the full length of the side 16 from one end 14 to the other end 14 of the hatch cover 11. The meeting edge 18 of the other hatch cover section 12 is provided with serrations or recesses 21 provided with upwardly extended projections or ledges 19 which are of tooth like cross sections and fit into the respective recesses 17 of the adjacent side 16 of the other hatch cover section 11. The ledges 19 form steps with recesses 21 which steps are inclined inwardly and downwardly of the section 12 and the corresponding steps formed by the ledges 22 formed between the recesses 17 on the other cover section 11 are inclined inwardly and upwardly, so that the complemental ledges 19 and 22 in the meeting sides of the adjacent sections are teethlike and interlocking. Thus after the hatch cover 12 is in position, the other cover section 11 can be placed in position so that the central edge thereof interlocks with the adjacent central edge of the cover section 12. The joint so formed is a sealing joint which prevents any moisture or water to flow in through the joining edges of the hatch cover sections.

Each of the hatch cover sections is buoyant. In the present illustration each section includes the bottom 10 from which extend the end walls 14 upwardly. The end walls 14 at their top are mitered or converged inwardly and upwardly at the portion 23, and each of said mitered sections of the inclined walls 23 are suitably recessed at the outer top edge 24. The outer wall 13 is formed straight as shown in Fig. 4 and Fig. 5. The inner or central wall 16 and 18 of each section is formed vertically, but on the outer side of each of these central walls 16 and 18 are the tooth like longitudinal ledges, and interlocking recesses as heretofore described. A suitable top wall 26 extends into recesses 24 of the upper portions 23 of said end walls 14 as well as into suitable overlapping joints 25 at the respective sides 13 and 16 or 18 of the hatch cover sections 11 or 12. The walls heretofore described include an air tight compartment which is sufficient to render the respective cover sections buoyant, and even to float a reasonable load thereon so that they may function as life rafts or barges or the like. A honeycomb of rib plates 27 is provided in each section, both transversely and longitudinally, being preferably formed of intersecting rib plates which extend from the bottom 10 to the top 26, and longitudinally from the end 14 to the other end 14 and transversely from the outer wall 13 to the inner wall 16 or 18. This rib structure braces the cover against stresses in all directions. For the reduction of weight it is preferable that these rib plates 27 be perforated as indicated at the holes 28 in Figs. 4, 5 and 6.

The aforedescribed sectional hatch cover is made up of comparatively light sections which are buoyant yet very strong and can carry loads in water either as life rafts or as loading or unloading barges.

In order to facilitate the lifting of these hatch covers from the hatch and the placing them in position, I provide several pockets 29 with cross bars 31 in the walls 14 and 23, so that hooks of usual kind can be hooked onto these bars 31 and the hatch cover sections can be easily lifted or lowered.

Figure 2:
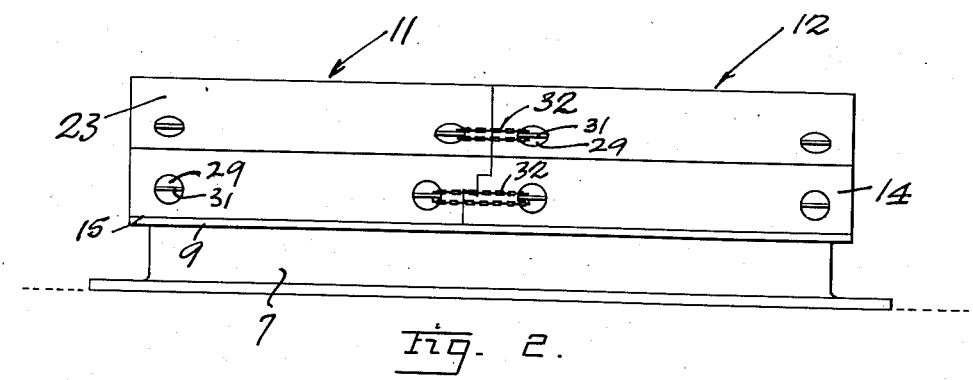
Fig. 2 is a side view showing said hatch cover on the hatch.

These pockets 29 and bars 31 are arranged in horizontal alignment with one another in such a manner that when a pair of such hatch cover sections 11 and 12 are united then a tying element such as a chain 32, as illustrated in Figs. 1 and 2, can be drawn over the respective bars 31 in the adjacent pockets 29 and tightly secure the said hatch cover sections together. This is a particularly advantageous feature at times when several of such covers are secured together to provide a large support or carrying surface as a life raft or as a loading or landing barge.

To render the use of these combined sections safer, the same are provided with spaced sockets 33 around the top into which suitable posts may be secured for supporting suitable rails, not shown. A base plate with preformed bolt holes, as shown at 34 in Fig. 1, can accommodate any power plant such as an outboard motor and accessories, the propeller of which may be projected into the water at said side of the unit and the raft may be then propelled as desired.

The sectional hatch cover heretofore described is eminently adapted to cover and seal a hatch; it is easy to lift or lower into position; it is comparatively light and can be swung over the side and used in the water either as a life raft or as a barge, whenever it is not used as a hatch cover. The combination hatch cover and raft herein described can be used without any adjustment and can be assembled for either position or use very rapidly by the average labor available.

I claim:

1. In a hatch cover, a plurality of buoyant hatch cover sections complementing one another to cover a hatch, sealing ledges on the outsides of said sections, and interlocking sealing ledges between the adjacent sections, said sealing ledges including a series of steps offset relatively to one another, pointed outer corners of each step defining a socket, the steps being complemental on adjacent sections for interlocking the steps of one section with the sockets of the adjacent section.

2. In a hatch cover, a plurality of hollow buoyant hatch cover sections complementing one another to cover a hatch; the meeting sides of adjacent sections being stepped oppositely forming complemental interlocking steps, each step of one meeting side being inclined inwardly and downwardly of its section, and the corresponding steps of the other meeting side being inclined inwardly and upwardly of its section to form teethlike interlocking ledges; a downwardly projecting cross-sectionally angular support ledge on the outer sides of each section; and a detachable device for connecting and holding said sections in interlocked position.

EAN LEE BUSH.

REFERENCES CITED

The following references are of record in the file of this patent:

UNITED STATES PATENTS

| Number | Name | Date |
| --- | --- | --- |
| 12,743 | Pheatt | Apr. 17, 1855 |
| 18,816 | Keyser | Dec. 8, 1857 |
| 867,294 | O'Haire | Oct. 1, 1907 |
| 1,005,426 | Green | Oct. 10, 1911 |
| 2,091,775 | Yorke | Aug. 31, 1937 |
| 2,376,245 | Frick | May 15, 1945 |

FOREIGN PATENTS

| Number | Country | Date |
| --- | --- | --- |
| 8,610 | Great Britain | 1893 |